Feb. 16, 1926.
A. H. BEYER
1,573,133
PROCESS AND APPARATUS FOR MEASURING KINETIC ENERGY
Original Filed March 8, 1919
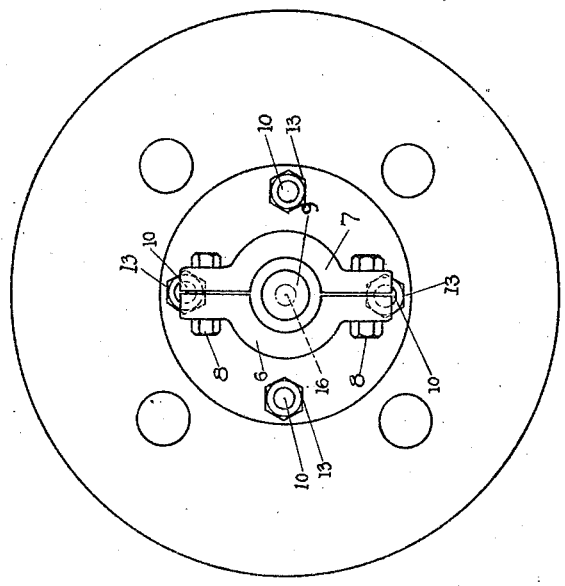
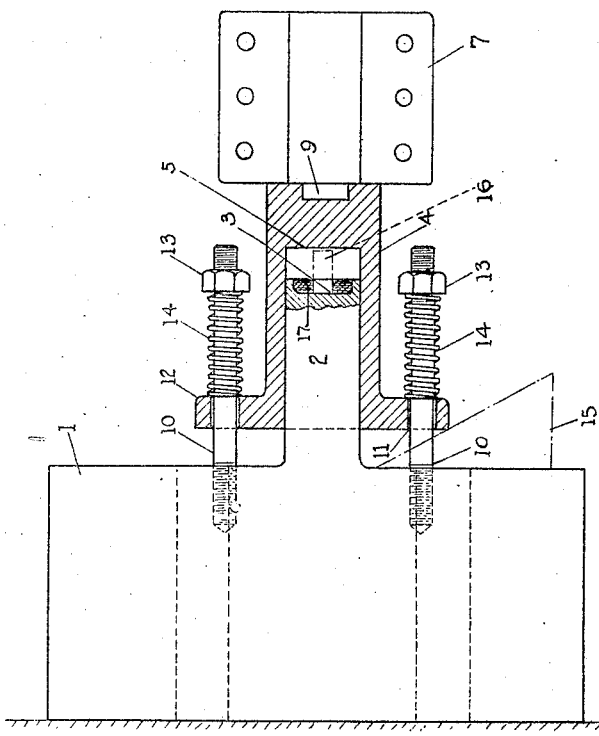
INVENTOR
A. H. Beyer
BY
Duell, Warfield & Duell
ATTORNEYS Patented Feb. 16, 1926.

1,573,133

UNITED STATES PATENT OFFICE.

ALBIN H. BEYER, OF NEW YORK, N. Y.

PROCESS AND APPARATUS FOR MEASURING KINETIC ENERGY.

Application filed March 8, 1919, Serial No. 281,365. Renewed April 10, 1924.

*To all whom it may concern:*

Be it known that I, ALBIN H. BEYER, a citizen of the United States, residing at New York, in the county of Queens and State of New York, have invented certain new and useful Improvements in Processes and Apparatus for Measuring Kinetic Energy, of which the following is a full, clear, and exact description, such as will enable others skilled in the art to which it appertains to make and use the same.

This invention relates to measuring apparatus and methods and with respect to its more specific features to apparatus and methods for measuring the energy of recoil, shock or impact developed in machines or parts of machines, such as rapid fire guns, in which latter much of the energy of the explosion is expended in the production of recoil, shock, impact, etc.

One object of the invention is to enable the energy or recoil, shock or impact developed by devices of the character referred to to be accurately determined with a view to increasing the efficiency of operation of such devices.

Another object of the invention is to enable the energy of recoil, shock or impact of a rapid fire gun to be certainly determined and accounted for with a view to improving the methods of handling and operating the gun.

Another object of the invention is the provision of a body of low resilience the shape of which permanently displays a factor of the expenditure of energy above referred to.

Another object of this invention is to measure the initial impulse of the shock or impact by transmitting directly the impulse produced without dynamically transforming it into any other form of motion or energy.

Another object is to measure the initial impulse of the shock or impact by transmitting the impulse produced directly through a homogeneous medium.

Another object is to provide means to measure pulsating kinetic energy, by transmitting the pulsations through a homogeneous medium to a deformable gauge body while maintaining the same relative position of the parts during intermissions.

Other objects will be in part obvious and in part pointed out hereinafter.

The invention accordingly consists in the several steps and the relation and order of one or more of such steps with relation to each of the others thereof, and in the features of construction, combinations of elements and arrangement of parts which will be exemplified in the method hereinafter disclosed and the construction hereinafter set forth, and the scope of the application of each of which will be indicated in the following claims.

In the accompanying drawing forming part of this specification, and wherein similar reference characters refer to similar parts throughout the several views,—

Figure 1 is a side elevation, partly in section, of a device or apparatus suitable for carrying out the method;

Fig. 2 is a front elevation of the device.

Referring now more specifically to the drawing, the numeral 1 indicates a fixed abutment which may be a heavy mass of metal or metal backed by concrete so as to be stationary and rigid. A portion of the abutment 1 may be extended to provide a cylindrical extension or press jaw 2, the front face of which is countersunk to provide a seat 3. Slidably mounted on the extension 2 is a metallic sleeve 4 having an end face, or press jaw 5, which may approach and recede from the face 3, which latter provides a companion press jaw. To the movable jaw or sleeve is secured a member adapted to hold an energy-producing device in fixed relation thereto. In the present embodiment this member comprises a clamp composed of the two jaws 6 and 7, one of said jaws, as 6, being an integral part of or otherwise rigidly fixed to the sleeve 4, and the other jaw cooperating with the jaw 6 to clamp a gun in position and hold it so that the energy of recoil will move the jaw 5 toward the jaw 3. The numerals 8 indicate bolts to set up the clamp for the purpose of securing the gun in position, and the butt or other suitable part of the gun may be received in a recess 9 provided in the sleeve 4. The sleeve 4 is guided relative to the extension 2 by means of a series of pins 10 spaced circumferentially around the extension 2 and anchored in the abutment 1, as by being screwthreaded thereinto. These pins pass through openings 11 in the circular flange 12 of the sleeve 4 and are screwthreaded at their ends for the reception of nuts 13 between which and the flange 12 springs 14 are disposed, which springs operate to yieldingly restrain movement of the jaw 5 away from the abutment and the jaw 3. A wedge 15 is indicated in dotted lines in Fig. 1 between the flange 12 and the abutment 1, and when in position between such parts serves to prevent movement of the jaw 5 toward the jaw 3, but upon removal permits the approach of the members of the pair of jaws referred to.

The numeral 16 indicates a gauge body, or medium, adapted to be interposed between the faces 3 and 5 of the jaws of the press embodied by the association of elements above referred to, one end of the gauge body being seated against the face 3, the other end being opposite the face 5, a filling member or washer of rubber, or other device 17 surrounding the gauge body in the recessed end of the extension 2 and adapted to maintain the gauge body in operative position therein.

By clamping a gun, as for instance a rapid fire gun, between the members 6 and 7, it is held in fixed relation to the movable jaw 5, and upon firing the gun the recoil will cause impact of the jaw 5 on the gauge body 16, rearward movement of the gauge body 16 being completely resisted by the stationary jaw 3. The gauge body is composed of compressible material of low resilience and may be either metallic or non-metallic. A practical material is copper, and the gauge body may consist of a small solid cylinder of copper of predetermined dimensions. Upon inserting such a gauge body between the jaws 3 and 5 and subjecting it to the recoil, impact or shock produced by the gun, it will be deformed or changed in shape by reason of the compressive force engendered, and this deformation will be a permanent deformation which will be a measure of the energy of the impact, recoil or shock, due to so much of the expenditure of the energy as participates in the recoil. For instance, the compressing operation due to the recoil, impact or shock will shorten the copper gauge body and at the same time thicken it in places or throughout its length, the amount of such shortening and thickening depending upon the power of the forces in question and the number of applications of such forces.

In order to measure the amount of energy expended in the recoil, another gauge body similar to the gauge body 16 may be taken and deformed similarly to the first body by the expenditure of a known amount of energy, whereupon it will follow that the energy referred to expended in the gun will be equal to the known amount ascertained to be required to deform the second gauge body similarly to the first. For instance, a second gauge body similar to the first may be set upon a fixed rigid plate and weights of known value dropped thereon until it is deformed similarly to the original gauge body. The expenditure of energy occasioned by dropping the weights is readily calculable, and thus the original gauge body serves as a factor in determining the original expenditure of energy by the gun or other machine under test. The best results are obtained by employing a weight equal to that of the mass producing the energy of recoil, impact or shock; in the instance mentioned equal to the weight of the gun and the parts fixed thereto.

In the case of a rapid fire gun the discharges may be controlled, and either one or a series of shots fired. The gauge body 16 will be, as it were, serially deformed, under the expenditure of energy due to the series of shots, and its ultimate deformation will be a measure of the total energy of such serial expenditure.

In the case where a series of shots are fired, the first shot causes impact of the jaw 5 on the gauge body and consequent deformation of such body. This deformation being permanent, the body is immediately in position and condition to receive a succeeding or second impact. The rebound of the energy producing mass spaces the jaw 5 from the gauge body 16, so that a succeeding impact of the jaw 5 on the gauge body may be immediately effected, and the gauge body thereby further permanently deformed. Thus the energy due to rapidly repeated shots is accurately registered on the gauge body, this body being further and further deformed as the number of impacts increases. While the distances moved by the energy producing mass may not be the same for all cases, it is desirable, in a single case, to restrict such distances to approximately within a certain mximum. To this end the springs 14, while they permit the rebound of the jaws 5 from the gauge body, restrain the rebound within operative limits.

It will be observed also that by the foregoing a gauge body is provided which when permanently deformed by the expenditure of energy referred to is a permanent and accurate record of the operation or test in which it was utilized.

Thus by the above are accomplished, among others, the objects hereinbefore referred to.

As many changes could be made in carrying out the above method, and in the above construction, and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. A measuring device comprising, in combination, a pair of jaws, one having approaching and receding movements relative to the other, a deformable gauge between said jaws, and means adapted to hold an energy producing device in fixed relation to a movable jaw.

2. A measuring device, comprising, in combination, a fixed abutment, a press jaw movable toward said abutment, and means adapted to hold a gun in such fixed relation to said movable jaw that the energy of recoil will move said jaw toward said abutment.

3. A measuring device comprising, in combination, a fixed abutment, a press jaw movable toward said abutment, means adapted to hold a gun in such fixed relation to said movable jaw that the energy of recoil will move said jaw toward said abutment, and means operative to yieldingly restrain movement of said jaw away from said abutment.

4. A measuring device comprising, in combination, a fixed abutment, a press jaw movable toward said abutment, means adapted to hold a gun in such fixed relation to said movable jaw that the energy of recoil will move said jaw toward said abutment, means operative to yieldingly restrain movement of said jaw away from said abutment, and means adapted to prevent movement of said jaw toward said abutment under the energy of recoil, said last means being operative to permit said recoil movement.

5. The method of measuring the total expenditure during a selected time of pulsating kinetic energy, which comprises transmitting the individual pulsations over a uniform distance to a fixed gauge body.

6. The method of measuring the total expenditure during a selected time of pulsating kinetic energy, which comprises transmitting the individual pulsations through a homogeneous medium over a uniform distance to a fixed gauge body.

In testimony whereof I affix my signature.

ALBIN H. BEYER.